(12) United States Patent
Matsumoto et al.

(10) Patent No.: US 11,628,524 B2
(45) Date of Patent: Apr. 18, 2023

(54) MANUFACTURING METHOD OF STAPLE-LESS BINDING UNIT

(71) Applicant: FUJIFILM Business Innovation Corp., Tokyo (JP)

(72) Inventors: Masashi Matsumoto, Kanagawa (JP); Mitsuhiro Nakamura, Kanagawa (JP); Takayuki Uchiyama, Kanagawa (JP); Takumi Uegane, Kanagawa (JP); Satoko Monoe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/325,238

(22) Filed: May 20, 2021

(65) Prior Publication Data

US 2022/0152752 A1 May 19, 2022

(30) Foreign Application Priority Data

Nov. 17, 2020 (JP) .............................. JP2020-190710

(51) Int. Cl.
*B23P 15/00* (2006.01)
*B31F 5/02* (2006.01)
*B42B 5/00* (2006.01)

(52) U.S. Cl.
CPC ................. *B23P 15/00* (2013.01); *B31F 5/02* (2013.01); *B42B 5/00* (2013.01)

(58) Field of Classification Search
CPC ..... B31F 5/02; Y10T 29/49474; B21H 5/027; G03G 2215/00848; B21K 1/767
See application file for complete search history.

(56) References Cited

U.S. PATENT DOCUMENTS

| 2,188,222 | A | * | 1/1940 | Hibbs | ..................... B31F 5/027 |
| | | | | | 101/3.1 |
| 3,106,139 | A | * | 10/1963 | Leopoldi | ................... B31F 5/02 |
| | | | | | 493/393 |
| 5,177,932 | A | * | 1/1993 | Schmetzer | .............. B31F 5/025 |
| | | | | | 53/550 |

(Continued)

FOREIGN PATENT DOCUMENTS

| JP | S57137763 A | * | 8/1982 | ............. B21K 1/767 |
| JP | 6168146 B2 | * | 7/2017 | ............... B42B 5/00 |

(Continued)

OTHER PUBLICATIONS

JP-6168146-B2 machine translation (Year: 2017).*
JPS57137763A machine translation (Year: 1982).*

*Primary Examiner* — Michael W Hotchkiss
(74) *Attorney, Agent, or Firm* — JCIPRNET

(57) ABSTRACT

A manufacturing method of a staple-less binding unit that includes a first binding unit that has plural recesses and projections and a second binding unit that is arranged to face the first binding unit and has recesses and projections that fit to the recesses and the projections of the first binding unit and in which mediums are bound by being interposed between the first binding unit and the second binding unit in a thickness direction of the mediums includes forming the binding units with a die, adjusting center positions of projecting portions of the binding units formed by the die and removed from the die, and adjusting outer shapes of the projecting portions of which the center positions have been adjusted.

13 Claims, 6 Drawing Sheets

(56) References Cited

U.S. PATENT DOCUMENTS

| | | | | |
|---|---|---|---|---|
| 8,845,258 | B2* | 9/2014 | Mori | B31F 5/02 |
| | | | | 412/9 |
| 9,315,356 | B2* | 4/2016 | Yoshida | B31F 5/02 |
| 10,156,824 | B2 | 12/2018 | Makita et al. | |
| 10,386,773 | B2* | 8/2019 | Makita | B31F 5/022 |
| 10,543,655 | B2* | 1/2020 | Awano | B31F 5/02 |
| 10,632,706 | B2* | 4/2020 | Makita | B65H 37/04 |
| 10,974,532 | B2* | 4/2021 | Kishi | B42B 5/10 |
| 2004/0170401 | A1* | 9/2004 | Tsubouchi | B21C 37/155 |
| | | | | 386/362 |
| 2009/0260467 | A1* | 10/2009 | Kobayashi | B21K 1/063 |
| | | | | 72/370.04 |
| 2010/0162843 | A1* | 7/2010 | Kobayashi | B21J 5/12 |
| | | | | 72/377 |
| 2012/0148372 | A1* | 6/2012 | Mori | B42B 5/00 |
| | | | | 412/33 |
| 2012/0186085 | A1* | 7/2012 | Kobayashi | F16H 55/26 |
| | | | | 29/893.33 |
| 2014/0138896 | A1* | 5/2014 | Yoshida | G03G 15/6544 |
| | | | | 270/58.11 |
| 2018/0128363 | A1* | 5/2018 | Hagiwara | B21K 1/762 |
| 2021/0379648 | A1* | 12/2021 | Suzuki | C21D 9/32 |

FOREIGN PATENT DOCUMENTS

| | | |
|---|---|---|
| JP | 2017185785 | 10/2017 |
| JP | 2018158796 | 10/2018 |
| JP | 2018158807 | 10/2018 |

\* cited by examiner

MANUFACTURING METHOD OF STAPLE-LESS BINDING UNIT

CROSS-REFERENCE TO RELATED APPLICATIONS

This application is based on and claims priority under 35 USC 119 from Japanese Patent Application No. 2020-190710 filed Nov. 17, 2020.

BACKGROUND

(i) Technical Field

The present invention relates to a manufacturing method of a staple-less binding unit that binds a bundle of paper sheets or the like without using a binding staple.

(ii) Related Art

In relation to a staple-less binding unit (so-called staple-less stapler) that binds a bundle of paper sheets or the like without using a binding staple, techniques as described in JP2017-185785A, JP2018-158796A, and JP2018-158807A below are known in the related art.

A binding unit (50) that binds paper sheets with the paper sheets interposed between upper teeth (540) and lower teeth (550) that mesh with each other is described in JP2017-185785A. Projecting portions (541 and 551) of the teeth (540 and 550) in JP2017-185785A are formed in shapes including top surfaces (541a and 551a) which are planar surfaces extending along surfaces of the paper sheets, side surfaces (541b and 551b) that are inclined surfaces, first side surfaces (542b and 552b) that extend in a thickness direction of the paper sheets, and bottom surfaces (542a and 552a) that extend along the surfaces of the paper sheets. In addition, a configuration in which the top surfaces (541a and 551a) and the side surfaces (541b and 551b) that are inclined surfaces are formed as outwardly curved surfaces is also described. Note that, in JP2017-185785A, all the projecting portions (541 and 551) are formed in the same shape.

In JP2018-158796A, a configuration is described in which a lower pressing member (83B) has a teeth shape in which teeth composed of trapezoidal protruding portions (92), of which tip end portions are cut, are disposed at both ends interposing teeth composed of five protruding portions (91), of which tip ends are pointed, in a binding unit (51) in which paper sheets are bound while being interposed between an upper pressing member (83A) and the lower pressing member (83B). In addition, in JP2018-158796A, a configuration in which middle protruding portions (95) of which the protrusion amount is smaller than the protrusion amount of the protruding portions (91) and larger than the protrusion amount of the trapezoidal protruding portions (92) are disposed between the protruding portions (91) and the trapezoidal protruding portions (92) is also described.

In JP2018-158807A, a configuration is described in which a lower pressing member (83B) has a teeth shape in which teeth composed of low protruding portions (42A), of which tip end portions are pointed and the protrusion amount is small, are disposed at both ends interposing teeth composed of high protruding portions (42B), of which tip ends are pointed and the protrusion amount is large, in a binding unit (51) in which paper sheets are bound while being interposed between an upper pressing member (83A) and the lower pressing member (83B).

SUMMARY

Aspects of non-limiting embodiments of the present disclosure relate to a manufacturing method of a staple-less binding unit that improves a binding force in comparison with a case where there is a variation in center positions of binding projecting portions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a manufacturing method of a staple-less binding unit that includes a first binding unit that has a plurality of recesses and projections and a second binding unit that is arranged to face the first binding unit and has recesses and projections that fit to the recesses and the projections of the first binding unit and in which mediums are bound by being interposed between the first binding unit and the second binding unit in a thickness direction of the mediums. The method includes forming the binding units with a die, adjusting center positions of projecting portions of the binding units formed by the die and removed from the die, and adjusting outer shapes of the projecting portions of which the center positions have been adjusted.

BRIEF DESCRIPTION OF THE DRAWINGS

Exemplary embodiment (s) of the present invention will be described in detail based on the following figures, wherein:

FIG. 3A is an overall explanatory view, and FIG. 3B is an enlarged view of a projecting portion;

FIG. 4A is an explanatory view of a forming step, FIG. 4B is an explanatory view of a bending step, FIG. 4C is an explanatory view of a cutting step, FIG. 4D is an explanatory view of a first adjustment step, FIG. 4E is an explanatory view of a second adjustment step, and FIG. 4F is an explanatory view of an occlusion step;

FIG. 5A is an explanatory view of a state before adjustment, and FIG. 5B is an explanatory view of a state after adjustment;

FIG. 7A is an explanatory view showing a state where tip ends of projecting portions of a staple-less binding unit are in contact with a surface of the bundle of paper sheets, and FIG. 7B is an explanatory view showing a state where binding members in a state as shown in FIG. 7A are pressed against each other; FIG. 8A is an explanatory view showing a state where tip ends of projecting portions at the central portion of a staple-less binding unit are in contact with a surface of the bundle of paper sheets, FIG. 8B is an explanatory view showing a state where binding members in a state as shown in FIG. 8A are pressed against each other, and FIG. 8C is an explanatory view showing a state where the binding members in a state as shown in FIG. 8B are further pressed against each other.

DETAILED DESCRIPTION

Figure 1:
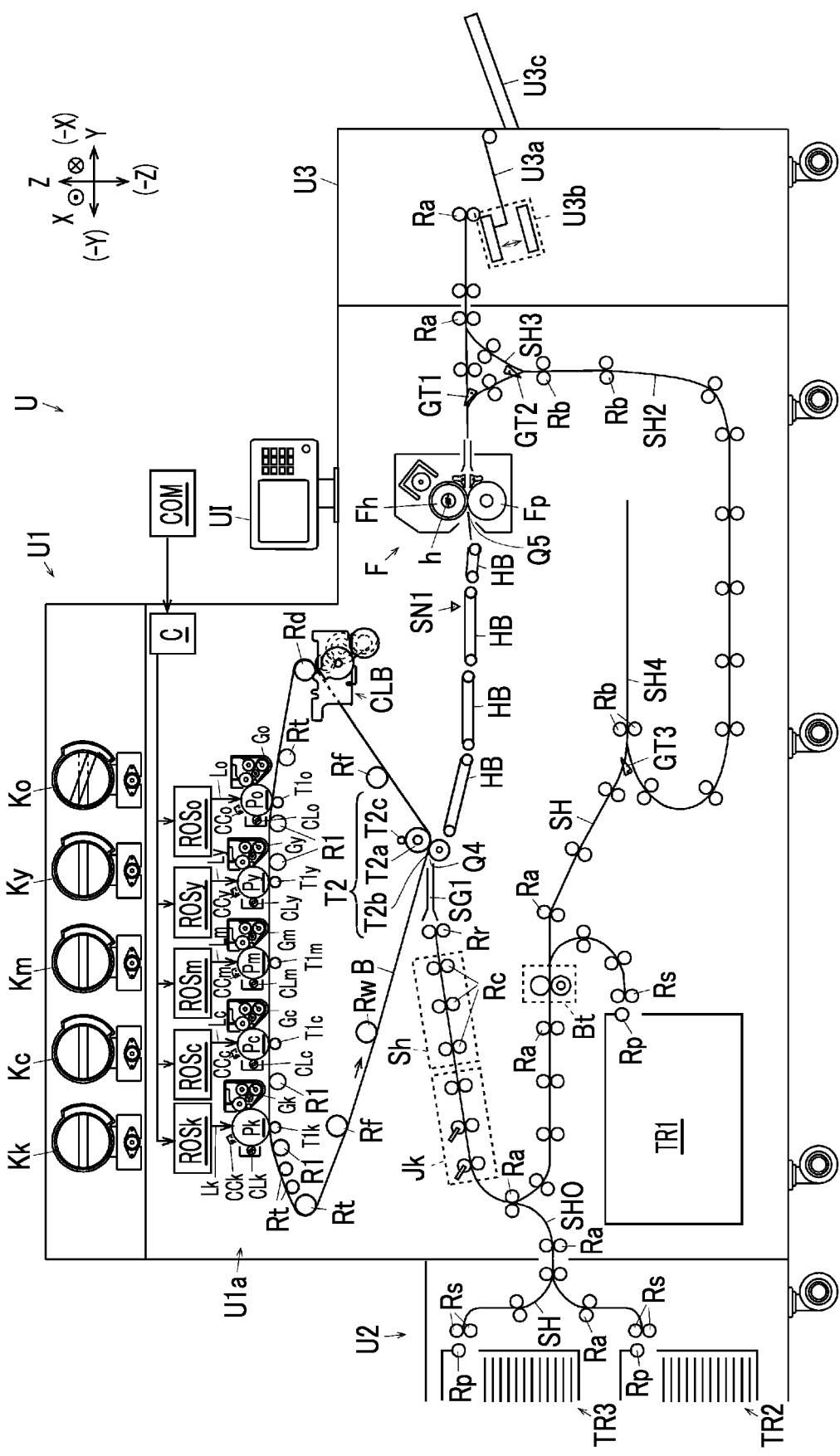
FIG. 1 is an explanatory view of an image forming apparatus of Example 1.

Next, an example as a specific example of an exemplary embodiment of the present invention will be described with reference to the drawings. However, the present invention is not limited to an example as follows.

For the sake of easy understanding of the following description, in the drawings, a front-rear direction will be referred to as an X-axis direction, a right-left direction will be referred to as a Y-axis direction, and a vertical direction will be referred to as a Z-axis direction. Directions and sides represented by arrows X, −X, Y, −Y, Z, and −Z are a frontward direction, a rearward direction, a rightward direction, a leftward direction, an upward direction, a downward direction, a front side, a rear side, a right side, a left side, an upper side, and a lower side, respectively.

In addition, in the drawings, a circle with a point therein means an arrow from the back of the paper to the front of the paper and a circle with a cross therein means an arrow from the front of the paper to the back of the paper.

In the following description which will be made by using the drawings, members other than members necessary for the description are not shown as appropriate for the sake of easy understanding.

Example 1

Description of Overall Configuration of Printer U in Example 1

FIG. 1 is an explanatory view of an image forming apparatus of Example 1.

In FIG. 1, a printer U, which is an example of the image forming apparatus in Example 1 of the present invention, has a printer body U1, a feeder unit U2 which is an example of a supplying device that supplies a medium to the printer body U1, an operation unit UI that a user operates, and a finisher U3 which is an example of a post processing device that performs post processing on a medium discharged from the printer body U1.

Description of Marking Configuration in Example 1

In FIG. 1, the printer body U1 has a control unit (example of controller part) C that controls the printer U, a communication unit (not shown) that receives image information transmitted from a printing image server COM which is an example of an information transmission device that is on the outside of the printer U and is connected via a dedicated cable (not shown), a marking unit U1a which is an example of a recording part that records an image on a medium, and the like. A personal computer PC, which is an example of an image transmission device that is connected via a cable or a line such as a local area network (LAN) and from which information of an image to be printed by the printer U is transmitted, is connected to the printing image server COM.

The marking unit U1a has photoreceptors Py, Pm, Pc, and Pk of respective colors which are yellow (Y), magenta (M), cyan (C), and black (K) and a photoreceptor Po that implies gloss to an image in a case where a photographic image or the like is to be printed, as an example of an image holding part. Surfaces of the photoreceptors Py to Po are formed of a photosensitive dielectric material.

In FIG. 1, around the photoreceptor Pk for black, a charger CCk which is an example of a charging part, an exposure machine ROSk which is an example of a latent image forming part, a developing machine Gk which is an example of a developing part, a primary transfer roller T1k which is an example of a primary transfer part, and a photoreceptor cleaner CLk which is an example of a cleaning part for the image holding part are arranged along a rotation direction of the photoreceptor Pk.

Similarly, around the other photoreceptors Py, Pm, Pc, and Po, chargers CCy, CCm, CCc, and CCo, exposure machines ROSy, ROSm, ROSc, and ROSo, developing machines Gy, Gm, Gc, and Go, primary transfer rollers T1y, T1m, T1c, and T1o, and photoreceptor cleaners CLy, CLm, CLc, and CLo are arranged.

Toner cartridges Ky, Km, Kc, Kk, and Ko, which are examples of a developing agent accommodation part, are detachably supported above the marking unit U1a. The toner cartridges Ky to Ko accommodate developing agents with which the developing machines Gy to Go are replenished.

Below the photoreceptors Py to Po, an intermediate transfer belt B, which is an example of an intermediate transfer part and is an example of an image holding part, is disposed. The intermediate transfer belt B is interposed between the photoreceptors Py to Po and the primary transfer rollers T1y to T1o. A rear surface of the intermediate transfer belt B is supported by a drive roller Rd which is an example of a driving part, tension rollers Rt which are examples of a tension applying part, a walking roller Rw which is an example of a meandering prevention part, a plurality of idler rollers Rf which are examples of a driven part, a backup roller T2a which is an example of a facing part for secondary transfer, a plurality of retracting rollers R1 which are examples of a movable part, and the primary transfer rollers T1y to T1o.

On a surface of the intermediate transfer belt B, a belt cleaner CLB which is an example of a cleaning part for the intermediate transfer part is disposed in the vicinity of the drive roller Rd.

A secondary transfer roller T2b which is an example of a secondary transfer member is disposed to face the backup roller T2a with the intermediate transfer belt B interposed therebetween. In addition, the backup roller T2a is in contact with a contact roller T2c, which is an example of a contact part, so that a voltage having a polarity opposite to a developing agent charging polarity is applied to the backup roller T2a.

The backup roller T2a, the secondary transfer roller T2b, and the contact roller T2c constitute a secondary transfer unit T2 which is an example of a secondary transfer part in Example 1 and the primary transfer rollers T1y to T1o, the intermediate transfer belt B, the secondary transfer unit T2, and the like constitute transfer devices T1, B, and T2 which are examples of transfer parts in Example 1.

Below the secondary transfer unit T2, a paper feed tray TR1 is provided as an example of an accommodation part. The paper feed tray TR1 accommodates a recording sheet S which is an example of a medium. A pickup roller Rp which is an example of an extraction part and a separation roller Rs which is an example of a separation part are disposed above and to the right of the paper feed tray TR1. A transportation path SH through which the recording sheet S is transported extends from the separation roller Rs. A plurality of transportation rollers Ra, which are examples of a transportation part that transports the recording sheet S to a downstream side, are arranged along the transportation path SH.

A deburring device Bt, which is an example of an unnecessary portion removing part, is disposed downstream of the separation roller Rs. The deburring device Bt performs removal of an unnecessary portion of an edge of the recording sheet S (so-called deburring) with the recording sheet S transported to the downstream side while being nipped with a pre-set pressure.

A multi-feed detection device Jk is disposed downstream of the deburring device Bt. The multi-feed detection device Jk measures the thickness of the recording sheet S passing therethrough to detect a state where a plurality of the recording sheets S overlap each other (so-called multi-feed).

Correction rollers Rc which are examples of a posture correction part are disposed downstream of the multi-feed detection device Jk. The correction rollers Rc correct inclination of the recording sheet S with respect to the transportation direction (so-called skew).

A registration roller Rr, which is an example of an adjustment part that adjusts the timing of transportation of the recording sheet S to the secondary transfer unit T2, is disposed downstream of the correction rollers Rc. In addition, a sheet guide SG1, which is an example of a medium guiding part, is disposed downstream of the registration roller Rr.

Note that, the feeder unit U2 is also provided with paper feed trays TR2 and TR3 and the like which are configured in the same manner as the paper feed tray TR1, the pickup roller Rp, the separation roller Rs, and the transportation rollers Ra and the transportation path SH from the paper feed trays TR2 and TR3 joins the transportation path SH of the printer body U1 at a position upstream of the multi-feed detection device Jk.

A plurality of transportation belts HB, which are examples of a medium transportation part, are disposed downstream of the secondary transfer roller T2$b$ in the transportation direction of the recording sheet S.

A fixing device F, which is an example of a fixing part, is disposed downstream of the transportation belts HB in the transportation direction of the recording sheet S.

In the finisher U3 which is disposed downstream of the fixing device F, a compile tray U3$a$, which is an example of a loading part, is disposed. A stapler U3$b$, which is an example of a binding unit and is an example of a binding device, is disposed on the compile tray U3$a$.

A stacker tray U3$c$, which is an example of a second loading part is disposed outside the compile tray U3$a$.

An inversion path SH2, which is an example of a transportation path branching off from the transportation path SH, is formed downstream of the fixing device F. At a place where the inversion path SH2 branches off from the transportation path SH, a first gate GT1, which is an example of a transportation direction switching part, is disposed.

A plurality of switchback rollers Rb, which are examples of a transportation part capable of forward rotation and backward rotation, are arranged on the inversion path SH2. A connection path SH3, which is an example of a transportation path that branches off from an upstream side portion of the inversion path SH2 and joins a portion of the transportation path SH that is disposed downstream of the place where the inversion path SH2 branches off from the transportation path SH, is formed upstream of the switchback rollers Rb. A second gate GT2 which is an example of a transportation direction switching part is disposed at a place where the connection path SH3 branches off from the inversion path SH2.

A turn-back path SH4 for reversal of the transportation direction of the recording sheet S (so-called switch-back operation), is disposed downstream of the inversion path SH2 while being disposed below the fixing device F. The switchback roller Rb, which is an example of a transportation part capable of forward rotation and backward rotation, is disposed on the turn-back path SH4. In addition, at the entrance of the turn-back path SH4, a third gate GT3, which is an example of a transportation direction switching part, is disposed.

Note that, the transportation path SH downstream of the turn-back path SH4 joins the transportation path SH of the paper feed tray TR1.

Marking Operation

In a case where the printer U receives image information transmitted from the personal computer PC via the printing image server COM, a job, which is an image forming operation, is started. In a case where the job is started, the photoreceptors Py to Po, the intermediate transfer belt B, and the like rotate.

The photoreceptors Py to Po are rotationally driven by a drive source (not shown).

A pre-set voltage is applied to the chargers CCy to CCo such that the surfaces of the photoreceptors Py to Po are charged.

The exposure machines ROSy to ROSo output laser light lays Ly, Lm, Lc, Lk, and Lo, which are examples of light for writing a latent image, in response to a control signal from the control unit C such that electrostatic latent images are written on the charged surfaces of the photoreceptors Py to Po.

The developing machines Gy to Go develop the electrostatic latent images on the surfaces of the photoreceptors Py to Po into visible images.

The toner cartridges Ky to Ko perform replenishment of developing agents consumed due to development in the developing machines Gy to Go.

A primary transfer voltage having a polarity opposite to the developing agent charging polarity is applied to the primary transfer rollers T1$y$ to T1$o$ and the visible images on the surfaces of the photoreceptors Py to Po are transferred to the surface of the intermediate transfer belt B.

The photoreceptor cleaners CLy to CLo removes developing agents remaining on the surfaces of the photoreceptors Py to Po after primary transfer to clean the surfaces.

In a case where the intermediate transfer belt B passes through a primary transfer region facing the photoreceptors Py to Po, images are transferred and superimposed onto the intermediate transfer belt B in the order of O, Y, M, C, and K and the intermediate transfer belt B passes through a secondary transfer region Q4 facing the secondary transfer unit T2. Note that, in the case of a monochromatic image, an image having only one color is transferred and sent to the secondary transfer region Q4.

The pickup roller Rp feeds the recording sheet S from the paper feed trays TR1 to TR3, to which the recording sheets S are supplied, in accordance with the size of received image information, designation of the recording sheet S, and the sizes, the types, and the like of the recording sheets S accommodated therein.

The separation roller Rs separates the recording sheets S fed from the pickup roller Rp one by one.

The deburring device Bt applies a pre-set pressure to the recording sheet S passing therethrough to perform deburring.

The multi-feed detection device Jk detects the thickness of the recording sheet S passing therethrough to detect multi-feed of the recording sheet S.

The correction rollers Rc correct skew by bringing the recording sheet S passing therethrough into contact with a wall surface (not shown).

The registration roller Rr feeds the recording sheet S in accordance with a timing when an image on the surface of the intermediate transfer belt B is sent to the secondary transfer region Q4.

The sheet guide SG1 guides the recording sheet S fed by the registration roller Rr to the secondary transfer region Q4.

At the secondary transfer unit T2, a secondary transfer voltage having the same polarity as the pre-set developing agent charging polarity is applied to the backup roller T2a via the contact roller T2c such that the image on the intermediate transfer belt B is transferred to the recording sheet S.

The belt cleaner CLB removes a developing agent remaining on the surface of the intermediate transfer belt B after the image is transferred at the secondary transfer region Q4 to clean the surface.

The transportation belts HB hold the recording sheet S, onto which the image has been transferred by the secondary transfer unit T2, with the surfaces thereof and transport the recording sheet S to a downstream side.

The fixing device F has a heating roller Fh which is an example of a heating part and a pressing roller Fp which is an example of the pressing part. A heater h which is an example of a heat source is accommodated in the heating roller Fh. The fixing device F fixes an image not yet fixed on the surface of the recording sheet S by heating and pressing the recording sheet S passing through a fixing region Q5 where the heating roller Fh and the pressing roller Fp are in contact with each other. The heating roller Fh and the pressing roller Fp constitute fixing parts Fp and Fh in Example 1.

In the case of two-sided printing, the first gate GT1 is operated such that the recording sheet S passing through the fixing device F is transported to the inversion path SH2. The transportation direction of the recording sheet S fed to the inversion path SH2 is reversed at the turn-back path SH4 (so-called switch-back operation). The recording sheet S switched back is transmitted again to the registration roller Rr through the transportation path SH, and printing is performed on the second surface thereof.

In a case where the recording sheet S is to be discharged in a state where a surface with an image recorded thereon faces an upper side (in case of so-called face-up discharge), the recording sheet S to be discharged to the stacker tray U3c is transported through the transportation path SH and is discharged to the stacker tray U3c via the compile tray U3a.

On the other hand, in a case where the recording sheet S is to be discharged in a state where the surface with the image recorded thereon faces a lower side (in case of so-called face-down discharge), the recording sheet S is transported into the inversion path SH2 from the transportation path SH once. Then, forward rotation of the switch-back rollers Rb is stopped after a trailing end of the recording sheet S in the transportation direction passes through the second gate GT2. Then, the second gate GT2 is switched and the switchback rollers Rb rotate backward, so that the recording sheet S is transported through the connection path SH3 and is transported to the stacker tray U3c.

In a case where a bundle of the recording sheets S is to be bound, the recording sheets S are loaded onto the compile tray U3a and are aligned by an aligning part (not shown). The aligned recording sheets S are bound by the stapler U3b. The bundle of the bound recording sheets S is discharged to the stacker tray U3c.

Description of Staple-Less Stapler

Figure 2:
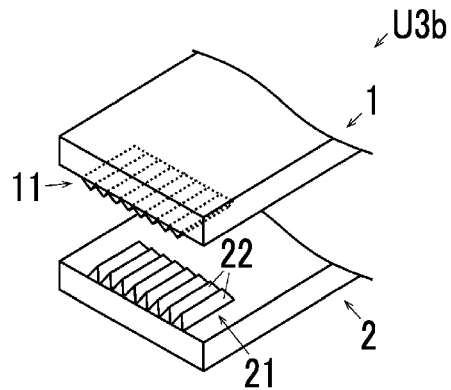
FIG. 2 is an overall explanatory view of a staple-less binding unit of Example 1.

FIG. 2 is an overall explanatory view of a staple-less binding unit of Example 1.

In FIG. 2, the stapler U3b of Example 1 is composed of a binding unit that performs a binding operation without using a binding staple (so-called staple-less stapler). The staple-less stapler U3b has an upper binding member 1 which is an example of a first binding unit and a lower binding member 2 which is an example of a second binding unit. The upper binding member 1 and the lower binding member 2 are supported to be movable toward each other and away from each other by a drive device including a motor, a gear, or the like (not shown).

Figure 3A:
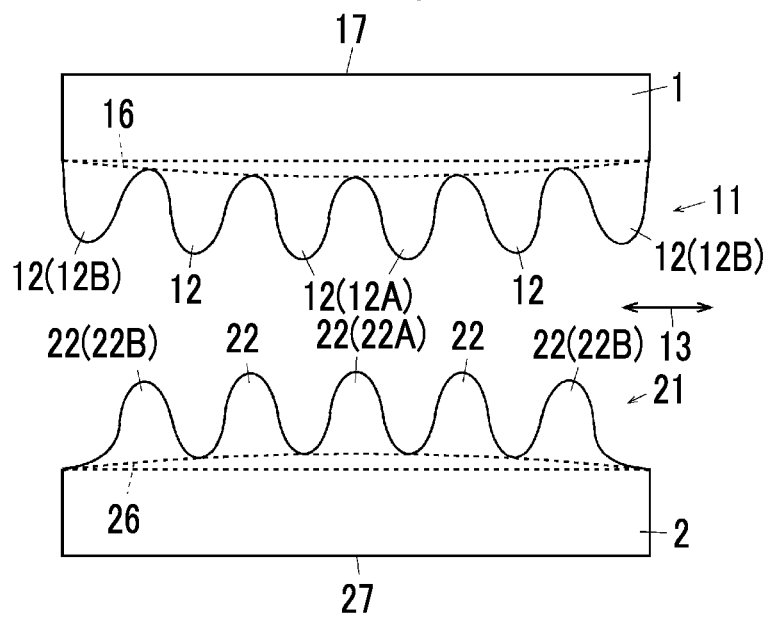
FIGS. 3A and 3B are explanatory views of a tooth portion of the staple-less binding unit of Example 1.
Figure 3B:
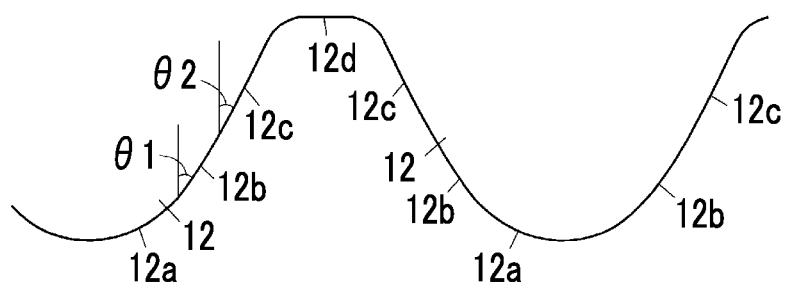

FIGS. 3A and 3B are explanatory views of a tooth portion of the staple-less binding unit of Example 1, FIG. 3A is an overall explanatory view, and FIG. 3B is an enlarged view of a projecting portion.

In FIGS. 2 to 3B, an upper tooth portion 11 is formed on a lower surface of the upper binding member 1. The upper tooth portion 11 has a plurality of projecting portions 12 and the projecting portions 12 are arranged along an arrangement direction 13. Therefore, the upper tooth portion 11 has a configuration with a plurality of recesses and projections.

In FIGS. 3A and 3B, top surfaces 12a of tip end portions of the projecting portions 12 of Example 1 are formed as curved surfaces. Tip end inclined surfaces 12b, which are examples of a first inclined surface and are examples of a tip end portion, are aligned with both end portions of each top surface 12a. A base end inclined surface 12c, which is an example of a second inclined surface and is an example of a base end portion, is aligned with a root side of each tip end inclined surface 12b. On the root side of the base end inclined surface 12c, a bottom surface 12d extending in parallel with the arrangement direction 13 is disposed. In Example 1, in comparison with an angle θ1 formed by the tip end inclined surface 12b and a direction (gravity direction) in which the binding members 1 and 2 are moved toward each other and are separated from each other, an angle θ2 formed by the base end inclined surface 12c and the gravity direction is small. That is, the base end inclined surface 12c is an inclined surface steeper than the tip end inclined surface 12b.

For example, in the example, θ1=35° and θ2=27°. In addition, ten teeth (projecting portions 12) are arranged along the arrangement direction 13.

In FIGS. 3A and 3B, from among the plurality of projecting portions 12 of the upper tooth portion 11 of Example 1, the projecting portions 12 (12A) of two teeth, which are teeth at the central portion in the arrangement direction 13 of the projecting portions 12 in the present example, have tip ends protruding further than the projecting portions 12 (12B) disposed at positions different from the central portion. Specifically, the projecting portions 12 of Example 1 are formed to have the same size. However, regarding base end portions of the projecting portions 12, the projecting portions 12 (12A) at the central portion in the arrangement direction 13 protrude to be closer to a tip end side than the projecting portions 12 (12B) at both end portions in the arrangement direction 13. In other words, regarding the plurality of projecting portions 12, the projecting portions 12A at the central portion in the arrangement direction 13, the projecting portions 12B at the end portions, and projecting portions 12C at intermediate portions between the central portion and the end portions are different from each other in protrusion amount and a degree to which the plurality of projecting portions 12 protrude in a projecting direction increases toward the central portion from the end portions in the arrangement direction 13. In Example 1, as represented by broken lines in FIGS. 3A and 3B, a straight line 16 connecting the base end portions is formed in a bow shape such that a degree to which the straight line protrudes increases toward the central portion. That is, a degree to which the positions of base ends of the projecting portions 12 protrude in the projecting direction increases toward the central portion from the end portions in the arrangement direction 13. In the present example, the teeth at the central portion are two central teeth. However, one central tooth may be the tooth at the central portion and approximately six teeth may be the teeth at the central portion on the contrary. In a case where a plurality of (for example, six) teeth are the teeth at the central portion, the average height of the teeth may be used.

Note that, the lower binding member 2 is formed such that the lower binding member 2 and the upper binding member 1 form a vertically symmetrical shape and has a lower tooth portion 21 and projecting portions 22 that are configured in the same manner as the upper tooth portion 11 and the projecting portions 12. Note that, the upper tooth portion 11 and the lower tooth portion 21 are disposed to be offset from each other in the arrangement direction 13 such that the top surfaces 12a of the projecting portions 12 of the upper tooth portion 11 face the bottom surfaces 12d of the projecting portions 22 of the lower tooth portion 21 and in a case where the upper binding member 1 and the lower binding member 2 are moved toward each other, the upper tooth portion 11 and the lower tooth portion 21 mesh with each other.

Description of Manufacturing Method

Figure 4A:
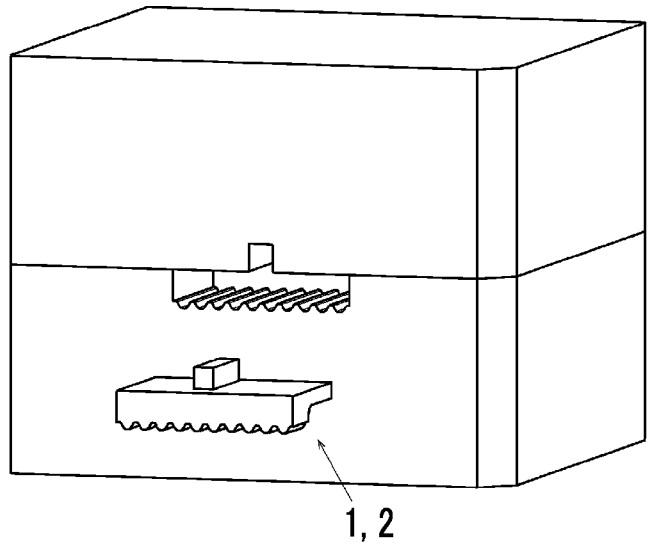
FIGS. 4A to 4F are explanatory views of a binding member manufacturing method of Example 1.
Figure 4B:
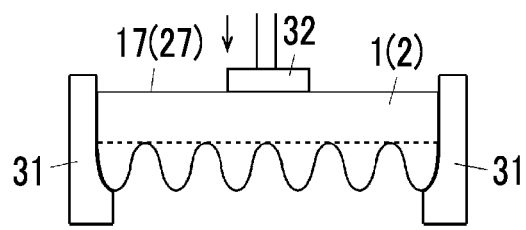
Figure 4E:
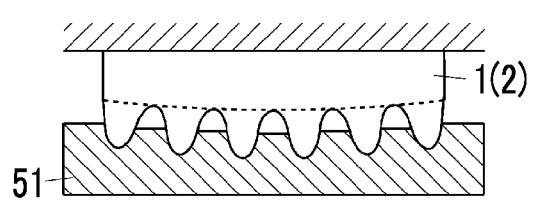
Figure 4C:
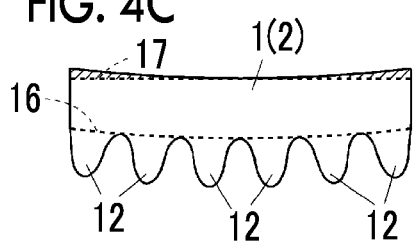
Figure 4F:
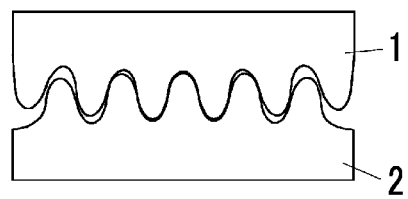
Figure 4D:
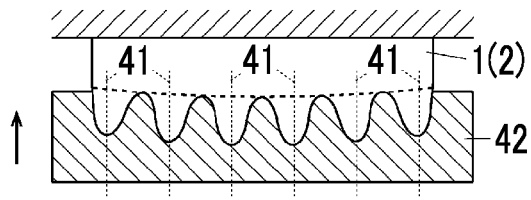

FIGS. 4A to 4F are explanatory views of a binding member manufacturing method of Example 1, FIG. 4A is an explanatory view of a forming step, FIG. 4B is an explanatory view of a bending step, FIG. 4C is an explanatory view of a cutting step, FIG. 4D is an explanatory view of a first adjustment step, FIG. 4E is an explanatory view of a second adjustment step, and FIG. 4F is an explanatory view of an occlusion step.

Next, a method of manufacturing the binding members 1 and 2 of Example 1 will be described.

Forming Step

In FIG. 4A, in the forming step, the binding members 1 and 2 are formed by using a molding die. As the die, a die in which the projecting portions 12 are arranged linearly along the arrangement direction 13 is used. For example, each of the binding members 1 and 2 of Example 1 is formed of metal and can be formed by using a metal injection method which is an example of a sintering method. Note that, the way in which the binding members 1 and 2 are formed is not limited to metal injection, and the binding members 1 and 2 can be formed through any method such as precision casting, die casting, cutting, pressing, or a combination thereof.

Bending Step

In FIG. 4B, in the bending step, the binding members 1 and 2 created through the forming step are bent. In the bending step of Example 1, in a state where both end portions of the binding members 1 and 2 in the arrangement direction 13 are held by jigs 31, surfaces (rear surfaces 17) that are at the central portion in the arrangement direction 13 and are opposite to the tooth portions 11 and 21 are pressed by a pressing machine 32 such that the central portions of the binding members 1 and 2 are bent. Accordingly, each of the tooth portions 11 and 21 of the binding members 1 and 2 is processed in a bow shape such that the central portion thereof in the arrangement direction 13 of the base end portions protrudes.

Cutting Step

In FIG. 4C, in the cutting step, the rear surfaces 17 of the binding members 1 and 2 subjected to the bending step are cut to be flat. That is, each rear surface 17 is cut to be flat since the rear surface 17 is processed in a bow shape through the bending step and the rear surface 17 may have a wavy shape due to a variation at the time of molding. Accordingly, a pressure is easily applied to the rear surfaces 17 in a case where the binding members are incorporated into a binding device and mediums are bound by pressing the rear surfaces 17 and applying a pressure to the rear surfaces 17.

Figure 5A:
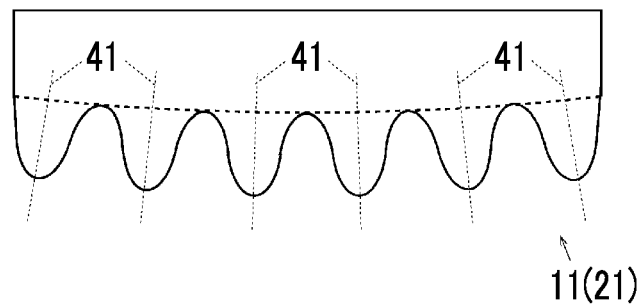
FIGS. 5A and 5B are enlarged views showing a part of the first adjustment step of Example 1.
Figure 5B:
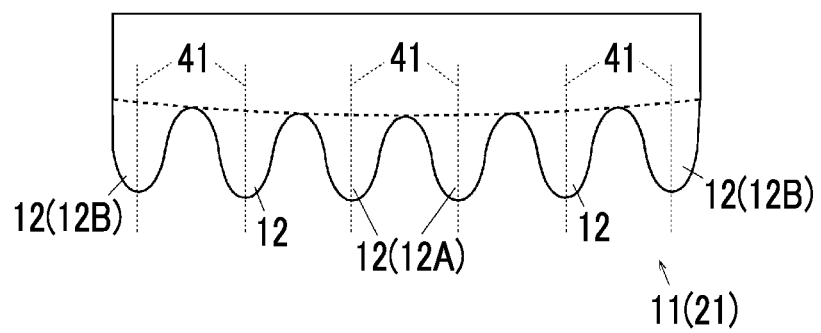

FIGS. 5A and 5B are enlarged views showing a part of the first adjustment step of Example 1, FIG. 5A is an explanatory view of a state before adjustment, and FIG. 5B is an explanatory view of a state after adjustment.

Sizing 1: First Adjustment Step

In FIG. 4D, in the first adjustment step, the center positions of the projecting portions 12 and 22 are adjusted. In FIG. 5A, in a case where the binding members 1 and 2 are pressed by the pressing machine 32 in the bending step, positional deviation of the tip ends or center positions 41 of the projecting portions 12 and 22 is likely to occur such that the closer to an outer side in the arrangement direction 13, the more the tip end is inclined outward. In the first adjustment step of Example 1, a first die 42 is pressed against the projecting portions 12 and 22 such that the center positions 41 of the projecting portions 12 and 22 are adjusted to pre-set positions as shown in FIG. 5B. That is, the projecting portions 12 and 22 are pressed and the positions thereof are adjusted such that the center positions 41 are arranged at pre-set intervals. Note that, in Example 1, the positions of the top portions (tip ends) of the projecting portions 12 and 22 are set as the center positions 41.

The first die 42 of Example 1 comes into contact with the tip end inclined surfaces 12b and the base end inclined surfaces 12c to press the projecting portions 12 and 22 such that the center positions 41 are adjusted. That is, the adjustment is performed with the entire projecting portions 12 and 22 pressed. Note that, the rear surfaces 17 need to be pressed in a case where the first die 42 is to be pressed and the rear surfaces 17 are made flat through the cutting step in Example 1. Therefore, it is easy to perform the adjustment by pressing the first die 42.

Figure 6:
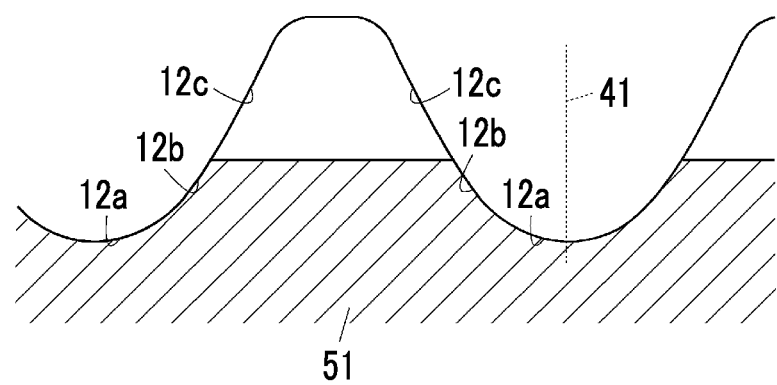
FIG. 6 is an enlarged view of a part of the second adjustment step of Example 1.

FIG. 6 is an enlarged view of a part of the second adjustment step of Example 1.

Sizing 2: Second Adjustment Step

In FIG. 4E, in the second adjustment step, the outer shapes of the projecting portions 12 and 22 are adjusted. In the first adjustment step, the projecting portions 12 and 22 are processed by being pressed by the first die 42 and the outer shapes of the projecting portions 12 and 22 may be disturbed. In particular, in the case of adjustment in which the center positions are adjusted, a large load is applied to each tooth and thus the outer shapes are likely to be disturbed. In addition, correction in which the area of contact with the die is large is also likely to cause a load to be applied to the teeth. In FIG. 6, in the second adjustment step of Example 1, a second die 51 is pressed against the projecting portions 12 and 22 such that the outer shapes of the projecting portions 12 and 22 are adjusted to outer shapes as shown in FIGS. 3A and 3B. The second die 51 of Example 1 comes into contact with the tip end inclined surfaces 12b and 22b to press the projecting portions 12 and 22 such that the outer shapes thereof are adjusted. That is, the adjustment is performed with the projecting portions 12 and 22 partially pressed. Therefore, in the second adjustment step, portions of the projecting portions 12 and 22 that are to be pressed are smaller than the first adjustment step.

Pairing: Occlusion Step

In FIG. 4F, in the occlusion step, the binding members 1 and 2 subjected to the second adjustment step are caused to mesh with each other and whether the binding members 1 and 2 mesh with each other such that a bundle of paper sheets can be bound is checked.

Action of Example 1

In the case of the printer U of Example 1 configured as described above, a bundle of the recording sheets S loaded onto the compile tray U3a is bound in a state of being interposed between the upper binding member 1 and the lower binding member 2 of the staple-less stapler U3b.

Figure 7A:
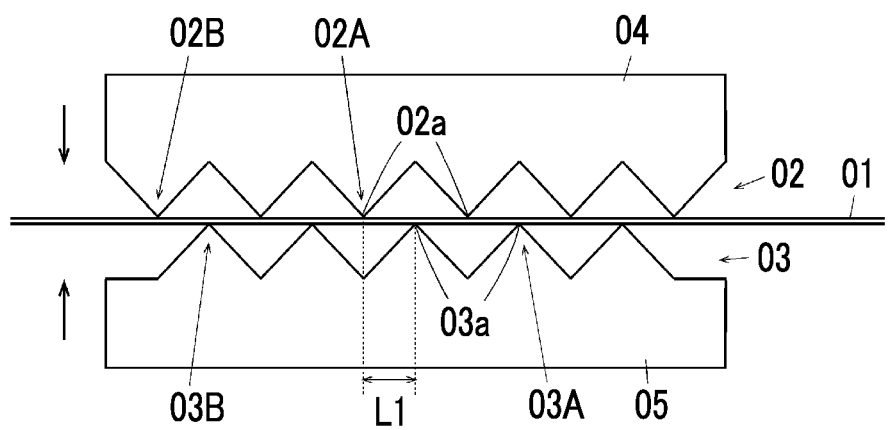
FIGS. 7A and 7B are explanatory views showing how a bundle of paper sheets is bound in a configuration in the related art.
Figure 7B:
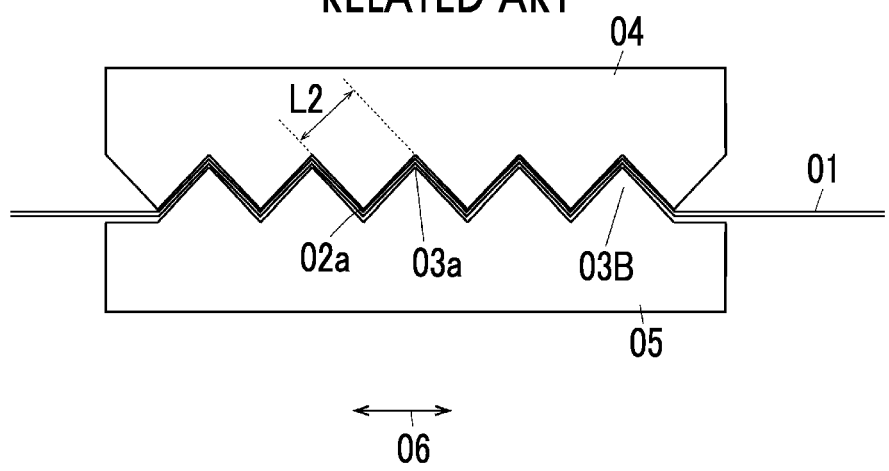

FIGS. 7A and 7B are explanatory views showing how a bundle of paper sheets is bound in a configuration in the related art, FIG. 7A is an explanatory view showing a state where tip ends of projecting portions of a staple-less binding unit are in contact with a surface of the bundle of paper sheets, and FIG. 7B is an explanatory view showing a state where binding members in a state as shown in FIG. 7A are pressed against each other.

In FIG. 7A, in the case of the configuration in the related art in which the heights of teeth are made uniform, there is a slight change in heights of the teeth of an actual product. This is because the cost of each tooth die is high in a case where the tooth die is made through a shaving process and thus the tooth die is manufactured by applying heat through sintering, metal injection, or the like. In this case, since the area of a surface of the tooth die that has teeth is larger than the area of a rear surface, the surface is cooled first and a so-called sink mark phenomenon occurs. Therefore, in a case where the tooth die is made through sintering, the tooth die that is recessed as a whole and of which the central portion is somewhat recessed and both ends protrude in comparison with the shape of a die is manufactured. In addition, the larger the teeth are, the more remarkable such a tendency is because the larger the teeth are, the larger a difference in surface area is. In other words, in a case where tooth tips are designed to be straight and molding is performed with a straight die shape, the resultant tooth die becomes not straight and as a result, the tooth die becomes recessed as a whole.

In the configuration in the related art, portions corresponding to top surfaces 02a and 03a, which are tip ends of all of projecting portions 02 and 03 or the projecting portions 02 and 03 at the central portion in an arrangement direction, are supposed to come into contact with recording sheets 01 first in a case where the recording sheets 01 are bound. However, in a case where binding members 04 and 05 are recessed as a whole, both end portions come into contact with the recording sheets 01 first instead of the central portion in the arrangement direction and there is a problem that the top surfaces 02a and 03a do not come into contact with the recording sheets 01 as supposed.

In a case where the recording sheets 01 are to be bound, the binding members 04 and 05 move toward each other and thus the recording sheets 01 are pressed and deformed in accordance with the shapes of the projecting portions 02 and 03 as shown in FIG. 7B. A relationship between a length L1 of the recording sheet 01 between the top surface 02a of the projecting portion 02 on an upper side and the top surface 03a of the projecting portion 03 on a lower side in a state as shown in FIG. 7A and a length L2 of the recording sheet 01 at the same portion in a state as shown in FIG. 7B is L1<L2.

Therefore, in a case where the recording sheets 01 are not extended with an increase in fiber-to-fiber distances of the recording sheets 01 or the like, the recording sheets 01 cannot be bound and the recording sheets 01 are torn.

Here, in a case where the top surfaces 02a and 03a of tooth portions 02B and 03B at both end portions in an arrangement direction 06 come into contact with the recording sheets 01 earlier than the tooth portions 02A and 03A at the central portion, both end portions of the recording sheets 01 are restricted by the top surfaces 02a and 03a of the tooth portions 02B and 03B at both end portions. Therefore, the lengths of the recording sheets 01 inside the top surfaces 02a and 03a of the tooth portions 02B and 03B at both end portions need to change from L1 to L2 by means of extension of the recording sheets 01. Therefore, there is a problem that the recording sheets 01 are likely to be torn although depending on the type of the recording sheets 01.

In addition, a binding force in a case of binding the recording sheets 01 is mainly determined by the shapes of teeth (projecting portions 02 and 03) and a binding region (width of binding members 1 and 2 in arrangement direction 13). Since the size of the binding region needs to be somewhat limited, every tooth needs to contribute to the binding force within the limited binding area. In a case where teeth at both ends are made small as in the related art described in JP2018-158796A and JP2018-158807A, there are teeth that cannot contribute to the binding force and there is a problem that an unevenness or a variation in binding force occurs.

Figure 8A:
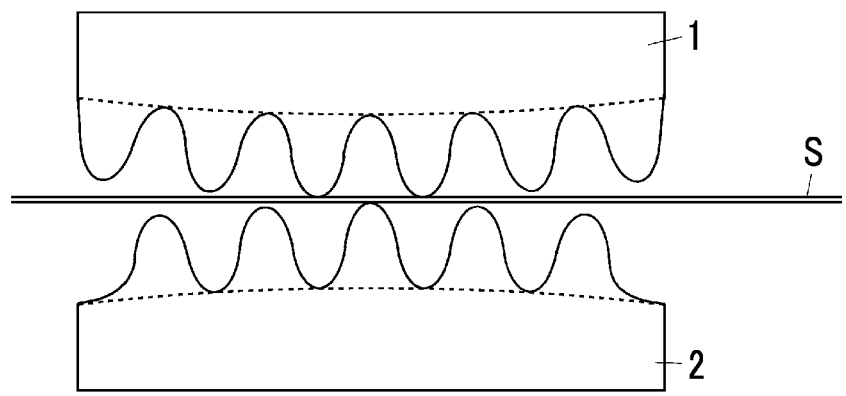
FIGS. 8A to 8C are explanatory views showing how a bundle of paper sheets is bound in a configuration in Example 1.
Figure 8B:
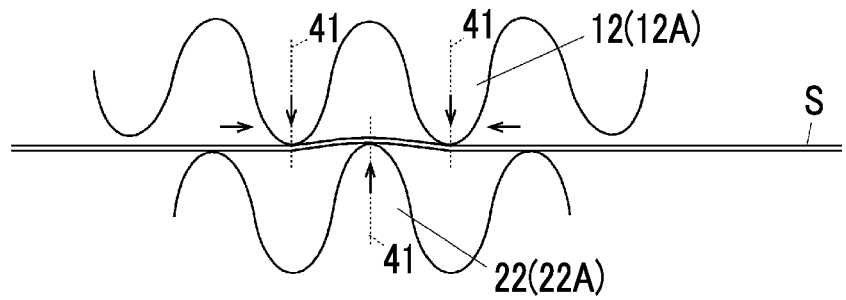
Figure 8C:
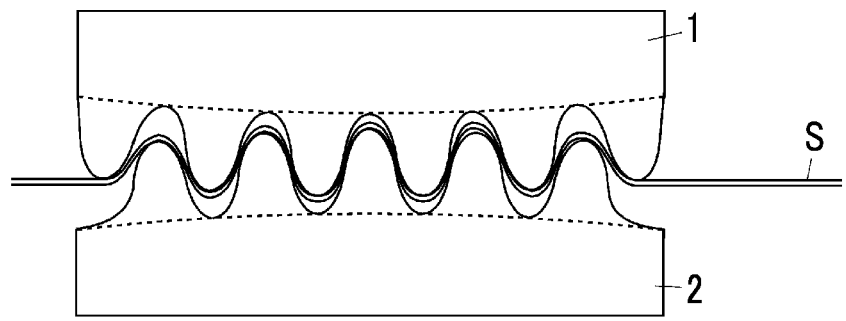

FIGS. 8A to 8C are explanatory views showing how a bundle of paper sheets is bound in a configuration in Example 1, FIG. 8A is an explanatory view showing a state where tip ends of projecting portions at the central portion of a staple-less binding unit are in contact with a surface of the bundle of paper sheets, FIG. 8B is an explanatory view showing a state where binding members in a state as shown in FIG. 8A are pressed against each other, and FIG. 8C is an explanatory view showing a state where the binding members in a state as shown in FIG. 8B are further pressed against each other.

In FIGS. 8A to 8C, in Example 1, the projecting portions 12A and 22A at the central portion in the arrangement direction 13 protrude further than the projecting portions 12B and 22B at both end portions and as shown in FIG. 8A, the projecting portions 12A and 22A at the central portion come into contact with mediums earlier than the other projecting portions 12B and 22B. Specifically, in a case where the recording sheets S are bound, the projecting portions 12A and 22A at the central portion come into contact with the recording sheets S first. Therefore, the recording sheets S enter a state where the recording sheets S are not yet restricted at an outer side in the arrangement direction 13 except for the central portion. Then, in a case where the recording sheets S start to be pressed by portions corresponding to the projecting portions 12A and 22A at the central portion, the recording sheets S can move inward from the outer side in the arrangement direction 13 as shown in FIG. 8B. Therefore, a change from L1 to L2 does not need to be made by means of extension of the recording sheets S only as long as a change to L2 is made by the addition of the length of a portion moving inward from the outer side. Accordingly, even in a case where the recording sheets S are types of recording sheets that are difficult to be extended, the recording sheets S may be bound without being torn.

In particular, the stapler U3b of Example 1 is configured such that the projecting portions 12A and 22A at the central portion protrude most and a protrusion amount decreases toward the outer side. Therefore, the recording sheets are likely to move to an inner side from the outer side in the arrangement direction 13 in order as the binding members 1 and 2 are pressed against each other and are not likely to be torn over the entire binding region.

In addition, in the case of the stapler U3b of Example 1, the projecting portions 12A and 22A at the central portion are caused to protrude through the bending step. Therefore, binding members configured as in the related art, in which the central portions do not protrude, can be used as the binding members 1 and 2 and thus it is not necessary to change a forming device. In addition, the material thicknesses of the tip ends and the base ends of the projecting portions 12 and 22 of the binding members 1 and 2 are different from each other and thus distortion may occur (so-called sink mark may be generated) since the degree of thermal expansion and the degree of thermal contraction are not uniform while the material is being solidified in the forming step. In the bending step of Example 1, the distortion is corrected and amended. As a result, teeth are arranged such that teeth at the central portion protrude.

In addition, in the case of the stapler U3b of Example 1, the center positions 41 of the projecting portions 12 and 22 of the binding members 1 and 2 are aligned in the first adjustment step. Ina case where there is positional deviation of the center positions 41 of the projecting portions 12 and 22, there is a possibility of a variation in force applied to the recording sheets S in a case where the binding members 1 and 2 are moved toward each other and a force is applied to the recording sheets S and thus the recording sheets S may be bound incompletely or torn. With regard to this, in Example 1, the center positions 41 are aligned in the first adjustment step and thus the recording sheets S are not likely to be torn and are likely to be bound reliably.

In particular, in the first adjustment step of Example 1, the first die 42 comes into contact with the tip end inclined surfaces 12b and 22b and the base end inclined surfaces 12c and 22c. Therefore, the first die 42 comes into contact with the inclined surfaces 12b, 12c, 22b, and 22c of the projecting portions 12 and 22 to adjust the center positions 41 while pressing the entire projecting portions 12 and 22 except for R portions of the tip ends. In the case of adjustment in which only the tip end inclined surfaces 12b of the projecting portions 12 and 22 are pressed, the tip end inclined surfaces 12b and 22b may be distorted with respect to the base end inclined surfaces 12c and 22c and the base end inclined surfaces 12c and 22c may be adjusted insufficiently. In a case where the base end inclined surfaces 12c and 22c are adjusted insufficiently, there is a problem that deviation of the center positions 41 is likely to become large at the time of adjustment in the second adjustment step.

In addition, in the case of adjustment in which only the base end inclined surfaces 12c of the projecting portions 12 and 22 are pressed, the positions of the top surfaces 12a and 22a of the tip end inclined surfaces 12b and 22b may be offset from the center positions 41. In a case where there is deviation of the center positions 41, positions where the projecting portions 12 and 22 come into contact with surfaces of the recording sheets S first, that is, positions where the recording sheets S are restricted become offset from predetermined positions. In a case where there is a variation in intervals between the projecting portions 12 and 22 and there is a variation in intervals between positions where the top surfaces 12a and 22a of the projecting portions 12 and 22 come into contact with the recording sheets S, there are a portion where the length of the recording sheets S between the top surfaces 12a and 22a is small and a portion where the length of the recording sheets S between the top surfaces 12a and 22a is large. In a case where the length of the recording sheets S is small, there is a problem that the recording sheets S are likely to be torn when the recording sheets S are extended in a case where the recording sheets S are to be bound, since room for extension is small. In other words, although there is no particular limitation, it is desirable that the paper extends evenly from the top of the projecting portion to the base end and thus it is favorable that projecting pitches are constant and the centers of the projecting portions match the centers of recessed portions with which the projecting portions mesh.

With regard to this, in Example 1, the first die 42 performs the adjustment while pressing the entire projecting portions 12 and 22 except for R portions of the tip ends. Therefore, adjustment may be performed at a higher accuracy in comparison with a case where the first die 42 does not press the entire projecting portions 12 and 22. Accordingly, in the case of the binding members 1 and 2 of Example 1, a variation in intervals between the projecting portions 12 and 22 is adjusted and thus the recording sheets S are restrained from being torn. Here, since the tip ends do not come into contact with the recording sheets, the tip ends are restrained from being crushed or the like due to a die load.

Furthermore, in the case of the stapler U3b of Example 1, the outer shapes of the projecting portions 12 and 22 of the binding members 1 and 2 are adjusted in the second adjustment step. In a case where the outer shapes of the projecting portions 12 and 22 are not predetermined shapes due to distortion or the like, there is a possibility of a variation in force applied to the recording sheets S in a case where the binding members 1 and 2 are moved toward each other and a force is applied to the recording sheets S and thus the recording sheets S may be bound incompletely or torn. With regard to this, in the second adjustment step of Example 1, the outer shapes are adjusted and thus the recording sheets S are not likely to be torn and are likely to be bound reliably.

In particular, in the second adjustment step of Example 1, the second die 51 comes into contact with the tip end inclined surfaces 12b and 22b to press the projecting portions 12 and 22. Ina case where the binding members 1 and 2 are moved toward each other and the recording sheets S are bound, portions corresponding to the tip end inclined surfaces 12b and 22b are the first portions stretching the recording sheets S. Therefore, in a case where there is a variation in outer shapes of the tip end inclined surfaces 12b and 22b, there is a variation in force applied to the recording sheets S and thus the recording sheets S may be bound incompletely or torn. In particular, in a case where the variation occurs at the start of a stretching process, adverse effects until the recording sheets S enter a state of being bound at the end become large. With regard to this, in Example 1, portions corresponding to the tip end inclined surfaces 12b and 22b on which a force acts at the start of a binding process are adjusted by the second die 51. Accordingly, in comparison with a case where the tip end inclined surfaces 12b and 22b are not adjusted, a variation in force applied at the start of a process of binding the recording sheets S is suppressed and the recording sheets S are restrained from being torn or the like.

In addition, in the case of a shape in which the base end inclined surfaces 12c and 22c are steeper than the tip end inclined surfaces 12b and 22b as in the case of the projecting portions 12 and 22 of Example 1, a force is slowly applied to the recording sheets S at the tip end inclined surfaces 12b and 22b, of which inclination is gentle than at the base end inclined surfaces 12c and 22c at the start of the binding process. That is, at the start of the binding process, the recording sheets S are slowly stretched. Then, after being extended to some extent at the tip end inclined surfaces 12*b* and 22*b*, the recording sheets S come into contact with the base end inclined surfaces 12*c* and 22*c* which are steep and are bound by being deformed into a final state receiving a force larger than a force applied thereto in the case of the tip end inclined surfaces 12*b* and 22*b*. Therefore, in a case where the recording sheets S are suddenly stretched at the start of the binding process, there is a problem that the recording sheets S are likely to be torn and in a case where there is a variation at the start of the binding process, there is a problem that the recording sheets S are likely to be torn at a stretching stage thereafter. In Example 1, the outer shapes of the tip end inclined surfaces 12*b* and 22*b* that come into contact with the recording sheets S at the start of the binding process are adjusted in the second adjustment step. Accordingly, the recording sheets S are restrained from being torn in comparison with a case where the outer shapes of the tip end inclined surfaces 12*b* and 22*b* are not adjusted.

Modification Examples

Hereinabove, the example of the present invention has been described in detail. However, the present invention is not limited to the above example and various modifications can be made within the scope of the gist of the present invention described in the claims. Modification examples (H01) to (H012) of the present invention will be described below.

(H01) In the above example, the printer U which is an example of the image forming apparatus has been described. However, the present invention is not limited thereto and for example, the printer U can also be composed of a copying machine, a fax machine, or a multifunction machine having a plurality of functions thereof or all of the functions thereof. In addition, the present invention is not limited to an electrophotographic image forming apparatus and the present invention can also be applied to any image forming apparatus such as an inkjet type image forming apparatus or a heat transfer printing type image forming apparatus.

(H02) In the example, the printer U having a configuration in which developing agents of five colors are used has been described. However, the present invention is not limited thereto and for example, the present invention can also be applied to a monochromatic image forming apparatus or a multicolor image forming apparatus in which four or less colors or six or more colors are used.

(H03) In the example, an endless band-shaped intermediate transfer belt B has been described as an example of the image holding part. However, the present invention is not limited thereto. For example, the present invention can also be applied to a cylindrical intermediate transfer drum, a photoreceptor drum, and a photoreceptor belt. In addition, the present invention can also be applied to a configuration in which no intermediate transfer body is provided and an image from a photoreceptor is directly recorded on the recording sheet S.

(H04) In the example, although there is no particular limitation, it is desirable that the bending step is performed. However, in a case where the central portion does not need to protrude or the central portion is formed to protrude in the forming step, the bending step can be omitted. In this case, distortion (sink mark) in the forming step can be adjusted through the first adjustment step and the second adjustment step.

(H05) In the example, although there is no particular limitation, it is desirable that the cutting step is performed. However, in a case where a jig that retains the rear surface 17 in each adjustment step can be prepared, the cutting step can be omitted.

(H06) In the example, the shapes of the projecting portions 12 and 22 are the same as each other. However, the present invention is not limited thereto. For example, the projecting portions 12 and 22 that are different from each other in shape and size can also be used. Note that, in a case where the shapes of the projecting portions 12 and 22 are different from each other, it is necessary to prepare the dies 42 and 51 in accordance with the difference in size. In addition, a configuration in which the projecting portions at the central portion protrude is desirable. However, the present invention is not limited thereto. For example, the projecting portions may be arranged in a shape in which the protrusion amounts of the central portion and both end portions are large and the protrusion amounts of intermediate portions between the central portion and the end portions are smaller than the protrusion amounts of the central portion and both end portions, that is, a W-like shape.

(H07) In the example, a configuration in which the base ends of the projecting portions 12 and 22 form an arc shape of which the central portion protrudes most, that is, an arch shape of which the protrusion amount continuously increases, has been described. However, the present invention is not limited thereto. For example, a configuration in which an increase in base end size is made in a stepwise manner such that a step-like shape is formed can also be adopted. In addition, the present invention is not limited to a configuration in which the protrusion amounts of the projecting portions 12 and 22 are changed in a one-by-one manner. For example, a configuration can also be adopted in which the protrusion amounts of a plurality of projecting portions are the same and a change in protrusion amount is made in a stepwise manner as in a case where the protrusion amounts of two projecting portions at the central portion are largest, protrusion amounts two projecting portions outside the projecting portions of which the protrusion amounts are largest are second largest, and the protrusion amounts of two projecting portions outside the projecting portions of which the protrusion amounts are second largest are third largest, . . . and so forth.

(H08) In the example, a configuration in which the finisher U3 and the printer body U1 are separated has been described. However, a configuration in which the finisher U3 and the printer body U1 are integrated with each other can also be adopted.

(H09) Note that, in Example 1, the entire projecting portions are pressed except for the tip ends. However, a configuration in which the first die presses the entire projecting portions including the tip ends and the second die presses the projecting portions except for the tip ends may also be adopted. In this case, particularly in a case where the amount of adjustment of the center positions is large, a force is easily transmitted since the area of contact is large in a case where the tip ends are also pressed. In addition, a possibility of a difference with respect to two tip end side inclined surfaces aligned with the tip ends of a tooth is made low.

(H010) In Example 1, the first die comes into contact with inclined surfaces on a base end portion side and inclined surfaces on a tip end portion side. However, a configuration in which the first die comes into contact with only the inclined surfaces on the base end portion side may also be adopted. In this case, the inclined surfaces on the base end portion side are greatly adjusted.

(H011) In Example 1, a die that is linear along the arrangement direction is used as the die. However, the present invention is not limited thereto. For example, it is also possible to use a recessed die so that the projecting portions 12 originally arranged in the arrangement direction 13 form a curved shape. The shape of a recess of the die can be set such that the projecting portions 12 form a curved shape even in consideration of deformation (sink mark) caused after the projecting portions 12 are extracted from the recessed die and cooled. Therefore, bending processing, the cutting step, and a sizing step in Example 1 can be omitted. In addition, even in a case where only sizing is performed without the bending processing or the like, a possibility that deviation of central lines occurs is low in comparison with Example 1 since the bending processing or the like is not performed. Therefore, sizing may be performed alone.

(H012) In the example, in the first adjustment step, although there is no particular limitation, it is desirable that the first die 42 comes into contact with the tip end inclined surfaces 12b and 22b and the base end inclined surfaces 12c and 22c. However, a configuration in which the first die 42 comes into contact with at least the base end inclined surfaces 12c and 22c and presses the base end inclined surfaces 12c and 22c can also be adopted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A manufacturing method of a staple-less binding unit that includes a first binding unit that has a plurality of recesses and projections and a second binding unit that is arranged to face the first binding unit and has recesses and projections that fit to the recesses and the projections of the first binding unit and in which mediums are bound by being interposed between the first binding unit and the second binding unit in a thickness direction of the mediums, the method comprising:
   forming the binding units with a die;
   bending an entire portion of each binding unit that has the recesses and the projections by pressing a portion of each binding unit that is on an opposite side to the portion having the recesses and the projections after the binding units are formed and before the center positions are adjusted so that the center positions are arranged at pre-set intervals;
   adjusting center positions of projecting portions of the binding units formed by the die and removed from the die, wherein positions of tip ends of the projecting portions are the center positions; and
   adjusting outer shapes of the projecting portions of which the center positions have been adjusted.

2. The manufacturing method of the staple-less binding unit according to claim 1,
   wherein the projecting portions have first inclined surfaces and second inclined surfaces that are closer to a base end side than the first inclined surfaces, and
   the outer shapes of the projecting portions are adjusted by using a second die that does not come into contact with the second inclined surfaces.

3. The manufacturing method of the staple-less binding unit according to claim 1,
   wherein a die for adjustment does not come into contact with tip ends of the projecting portions during adjustment of the center positions and adjustment of the outer shapes.

4. The manufacturing method of the staple-less binding unit according to claim 1,
   wherein the projecting portions have first inclined surfaces and second inclined surfaces that are closer to a base end side than the first inclined surfaces, and
   the center positions of the projecting portions are adjusted by using a first die that comes into contact with the second inclined surfaces.

5. The manufacturing method of the staple-less binding unit according to claim 4,
   wherein outer surfaces of the second inclined surfaces on the base end side are steeper than the first inclined surfaces of the projecting portions.

6. The manufacturing method of the staple-less binding unit according to claim 4,
   wherein the first die comes into contact with the first inclined surfaces as well.

7. The manufacturing method of the staple-less binding unit according to claim 6,
   wherein outer surfaces of the second inclined surfaces on the base end side are steeper than the first inclined surfaces of the projecting portions.

8. The manufacturing method of the staple-less binding unit according to claim 6,
   wherein outer shapes of tip end portions of the projecting portions are adjusted by using a second die that comes into contact with the first inclined surfaces that are on a projecting portion tip end side.

9. The manufacturing method of the staple-less binding unit according to claim 1, further comprising:
   processing the portion on the opposite side such that the portion on the opposite side is made flat after the portion having the recesses and the projections is bent and before the center positions are adjusted.

10. The manufacturing method of the staple-less binding unit according to claim 9,
    wherein the projecting portions have first inclined surfaces and second inclined surfaces that are closer to a base end side than the first inclined surfaces, and
    the center positions of the projecting portions are adjusted by using a first die that comes into contact with the second inclined surfaces.

11. The manufacturing method of the staple-less binding unit according to claim 10,
    wherein outer surfaces of the second inclined surfaces on the base end side are steeper than the first inclined surfaces of the projecting portions.

12. The manufacturing method of the staple-less binding unit according to claim 10,
    wherein the first die comes into contact with the first inclined surfaces as well.

13. The manufacturing method of the staple-less binding unit according to claim 12,
    wherein outer shapes of tip end portions of the projecting portions are adjusted by using a second die that comes into contact with the first inclined surfaces that are on a projecting portion tip end side.

* * * * *